United States Patent [19]
Rossi

[11] Patent Number: 5,063,279
[45] Date of Patent: Nov. 5, 1991

[54] METHODS AND APPARATUS FOR FUSING ARMATURE AND STATOR WIRES

[75] Inventor: Alessandro Rossi, Florence, Italy

[73] Assignee: Axis USA, Inc., Marlborough, Mass.

[21] Appl. No.: 436,633

[22] Filed: Nov. 15, 1989

Related U.S. Application Data

[63] Continuation-in-part of Ser. No. 412,279, Sep. 25, 1989, abandoned.

[51] Int. Cl.$^5$ ............................................. B23K 11/24
[52] U.S. Cl. .................................. 219/86.51; 219/87; 219/91.1; 219/117.1; 228/4.5
[58] Field of Search .................. 219/110, 86.51, 86.25, 219/86.41, 117.1, 91.1, 87; 228/4.5

[56] References Cited

U.S. PATENT DOCUMENTS

| | | | |
|---|---|---|---|
| 3,045,103 | 7/1962 | Warner | 219/78 |
| 3,449,541 | 6/1969 | Wilcox et al. | 219/86.51 |
| 3,514,569 | 5/1970 | Pfaelzer et al. | 219/86.51 |
| 3,727,822 | 4/1973 | Umbaugh | 219/110 |
| 3,781,981 | 1/1974 | Miura et al. | 219/87 |
| 4,079,225 | 3/1978 | Warner | 219/110 |
| 4,224,496 | 9/1980 | Riordan et al. | 219/110 |
| 4,249,068 | 2/1981 | Mangan et al. | 219/497 |
| 4,371,772 | 2/1983 | Szantho et al. | 219/89 |
| 4,419,558 | 12/1983 | Stiebel | 219/86.51 |
| 4,451,722 | 5/1984 | Szantho et al. | 219/86.25 |
| 4,484,056 | 11/1984 | Rossell | 219/86.51 |
| 4,504,724 | 3/1985 | Szantho et al. | 219/86.25 |
| 4,510,370 | 4/1985 | Szantho et al. | 219/86.25 |
| 4,562,330 | 12/1985 | Hamilton | 219/110 |

FOREIGN PATENT DOCUMENTS

| | | |
|---|---|---|
| D. 2538295 | 3/1977 | Fed. Rep. of Germany . |
| D. 3228039 | 2/1983 | Fed. Rep. of Germany . |
| 3711771 | 10/1988 | Fed. Rep. of Germany . |
| 1552165 | 9/1979 | United Kingdom . |
| 2105527 | 3/1983 | United Kingdom . |

OTHER PUBLICATIONS

Warner, Allan, "Fusing Automation For Electric Motor Production", *Coil Winding '88*, pp. 167–180.
Warner, Allan, "Automatic Thermal Control of Commutator Fusing and Brazing", *Coil Winding International*, pp. 34–38.
Warner, Allan, "Up and Down Slope Control", Joyal Products Incorporated.
Warner, Allan, "Commutator Design for Commutator Fusing", 11th Electrical Insulation Conference, 1973, pp. 122–126.

*Primary Examiner*—Clifford C. Shaw
*Attorney, Agent, or Firm*—Eric C. Woglom; Gerard A. deBlasi

[57] ABSTRACT

Methods and apparatus for fusing armature wires to a commutator, and fusing stator lead wires and stator hooks, are provided. An electrode assembly having a screw mechanism converts the rotational motion of a motor into a translational motion of the fusing electrode. A microprocessor-based control circuit receives electrode force and displacement data from a load cell and an encoder, respectively, to control the fusing operation. The fusing operation is performed according to a predetermined force or displacement function that is stored in the control circuit.

50 Claims, 11 Drawing Sheets

METHODS AND APPARATUS FOR FUSING ARMATURE AND STATOR WIRES

This is a continuation-in-part of application Ser. No. 07/412,279, filed Sept. 25, 1989, entitled Methods and Apparatus for Fusing Armature Wires.

BACKGROUND OF THE INVENTION

The present invention relates to fusing machines, and, more particularly, to machines for fusing the armature wires of an electric motor to a hook member ("tang") or slot of a commutator bar and for fusing wires to stator hooks.

Although fusing machines are widely used, a system for precisely controlling the fusing operation is not yet available. Prior attempts to control the fusing operation have involved timing the period during which electric current is applied to a workpiece. However, simple timing mechanisms do not provide any feedback to the fusing machine for quality control. Other fusing machines monitor the temperature of the joint being fused with fiber optics. Temperature monitors do not indicate either electrode pressure or electrode displacement, and therefore cannot determine whether the electrode is properly deforming and fusing the armature wire and commutator.

U.S. Pat. No. 4,371,772 describes a fusing machine having a spring assembly system. A shaft moves downward to cause an electrode to contact a commutator hook. The downward movement of the shaft causes the hook to bend and compresses a spring in the fusing machine. The shaft reaches a stop, and electric current is applied. Additional force is applied by the electrode to further deform the hook and the wire to create the cohesion joint. The magnitude of the additional force will depend on the previous spring compression, the remaining spring release, and the spring's physical properties.

Even slight variations in the resistance encountered by the electrode will alter the amount of the spring's compression in the prior art system. Such variations may be caused, for example, by changes in the hook geometry, the number of wires under a hook, or variations in hook materials and wire sizes. This makes it difficult to ensure that current is applied to the electrode when there is maximum surface contact between the electrode and the hook (as required for proper operation). Successive fusing operations also depend on these variable factors, making it difficult to maintain consistency and quality control. Whenever the fusing conditions change, laborious adjustments are required to guaranty ideal current supply position and electrode force application.

The mechanical resistance of a fusion or "cohesion" joint depends on the final pressure applied. Variations in the electrode position (hook deformation) alter the heating rates and the maximum temperatures of the parts. The heating rates and maximum temperatures influence wire insulation removal, electrode wear, and the final quality of the cohesion joint.

It would be desirable to provide a fusing machine which applies electrode force in a consistent manner, tailored to the physical characteristics of the workpiece, and independent of spring compression characteristics. It would also be desirable that such a machine be able to adjust for varying fusing conditions easily and quickly.

SUMMARY OF THE INVENTION

In view of the foregoing, it is an object of this invention to provide a fusing machine that applies electrode force to a workpiece in a consistent manner.

It is a further object of this invention to provide a fusing machine that applies electrode force tailored to the physical characteristics of the workpiece.

It is another object of this invention to provide a fusing machine that continuously monitors electrode force or electrode displacement.

It is still another object of this invention to provide a fusing machine that adjusts electrode force or electrode displacement according to a predetermined function.

These and other objects of the invention are accomplished by providing a fusing machine having a threaded sleeve for converting the rotary motion of a screw mechanism to a precise translation of the electrode in the electrode axis. The threaded sleeve and screw mechanism permits precise placement of the electrode in contact with the commutator hook or slot. Using the threaded sleeve and screw mechanism, the electrode can be consistently displaced for each fusing operation.

The fusing machine also includes a load cell for measuring electrode pressure, and an encoder for accurately determining the electrode displacement. A microprocessor-based control system receives pressure and displacement data from the load cell and encoder, respectively, and acts on a motor to modify those quantities.

The microprocessor stores a distinct, predetermined electrode displacement function with displacement as a function of time, $X(t)$, or displacement as a function of force, $X(p)$, for each hook or slot variation that the apparatus can process. Electrode position may be continuously measured and adjusted according to the displacement function. The apparatus applies current to the electrode when the electrode is in a predetermined displacement range, and terminates fusing when the electrode is in a second predetermined displacement range. This process is particularly well suited for fusing small diameter wires.

The microprocessor may also store a distinct, predetermined electrode force function with force as a function of displacement, $P(x)$, or force as a function of time, $P(t)$, for each hook or slot variation that the apparatus can process. The force exerted by the electrode on the workpiece may be continuously measured by a force transducer, e.g., a load cell, and adjusted according to the force function. The microprocessor control circuit acts on the motor to apply electrode force as a function of electrode displacement.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which.

DETAILED DESCRIPTION OF THE PREFERRED EMBODIMENTS

Figure 1:
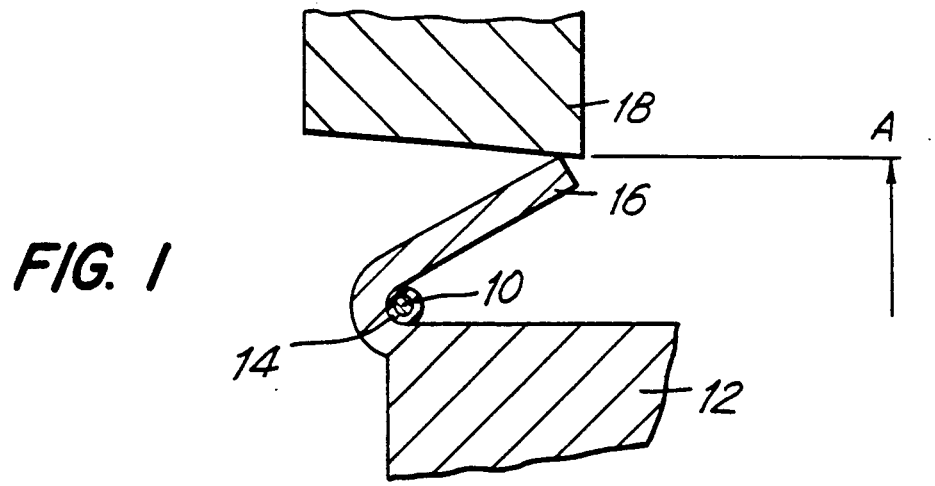
FIGS. 1–4 are partial elevational views of an electrode fusing a commutator hook and armature wire to a commutator bar.

FIGS. 1-4 illustrate the process for fusing a lead wire 10 of an armature to a commutator bar 12. Wire 10, covered by electrical insulation 14, is passed under a hook 16 on commutator bar 12. A high resistance tungsten electrode 18 contacts hook 16 at position A of FIG. 1. Electrode 18 applies pressure to hook 16, causing the hook to deform towards commutator bar 12 to form the fused joint. During deformation, a portion of the hook envelops wire 10 (or several wires).

Figure 2:
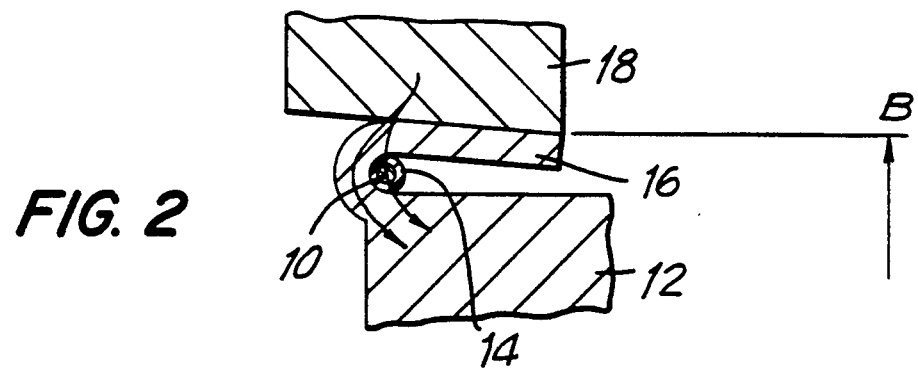
Figure 3:
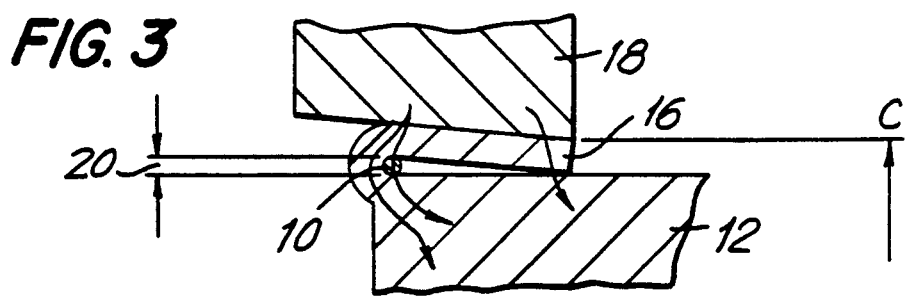
Figure 4:
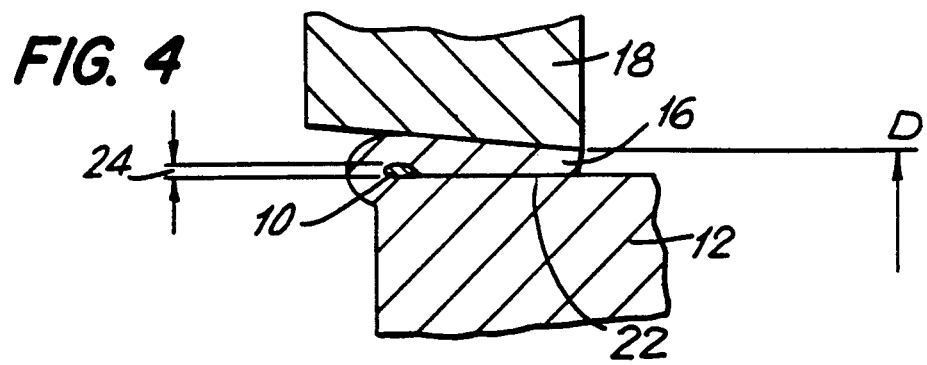

To achieve low current densities through the electrode, current is applied when the tip of electrode 18 has maximum surface contact with the hook, as shown at position B of FIG. 2. Current flowing to commutator bar 12 (and into a low resistance mass electrode 106 (FIG. 5)) passes along hook 16 and through wire 10, heating them. The heat vaporizes any insulation 14 that is in contact with hook 16. Electrode 18 applies pressure to and deforms hook 16, as current continues to flow through the hook. The electrode deforms hook 16 until the front end of the hook comes into contact with the commutator bar to be joined (position C of FIG. 3). A portion of the current passes through the end of hook 16 in its path through the commutator bar towards the mass electrode. Insulation vaporization continues in this phase. Wire 10 is not yet significantly deformed and has a diameter indicated by reference numeral 20.

Electrode 18 deforms hook 16 (see FIG. 4) until a predetermined amount of the front surface 22 of the hook contacts commutator bar 12, and continues to apply current to the hook. The pressure and current are applied until the cohesion joint forms between the hook's contact surface 22 and the bar. Hook 16 and wire 10 deform further until wire 10 has a predetermined diameter (designated by reference numeral 24).

The entire (designed) hook surface 22 must be in cohesion contact with the commutator bar to produce a connection with sufficient mechanical resistance to prevent the contact from disconnecting when subjected to high centrifugal forces (high armature speeds). Also, the deformed diameter 24 of wire 10 must be within a predetermined range. This ensures that the mechanical resistance of the wire is acceptable, and that the wire contacts a sufficient hook surface area to give the connection the correct electric resistance. Insulation 14 must be entirely removed from the portion of the wire that contacts the hook surface, to give the connection the correct electric resistance.

Figure 5:
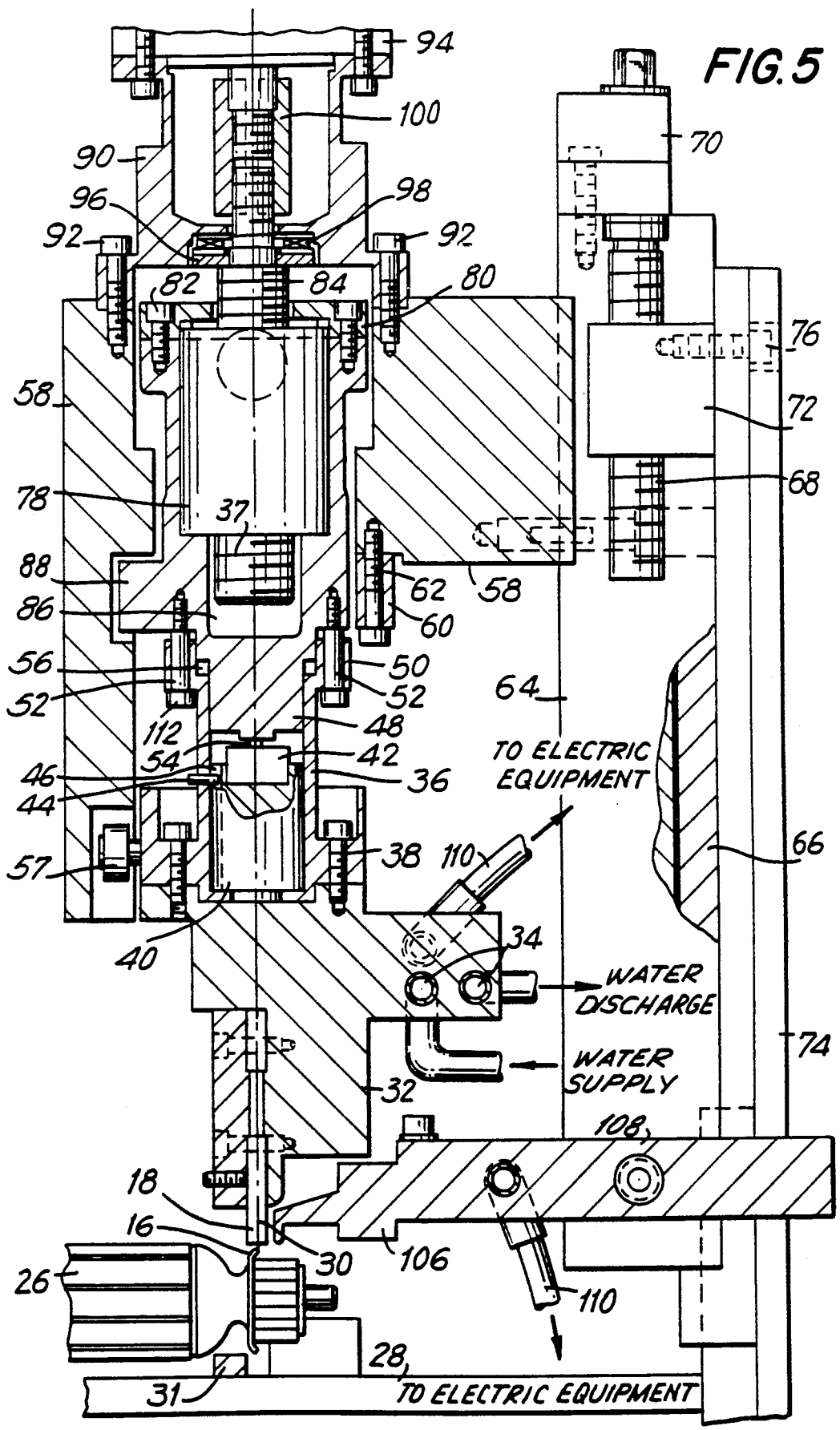
FIG. 5 is a cross-sectional view of an illustrative embodiment of a fusing machine constructed in accordance with the principles of this invention.

Referring to FIG. 5, the armature 26 is firmly mounted and positioned on a stationary work plane 28. A conventional angular positioning unit (not shown) typically aligns the commutator hook to be processed with the electrode axis 30. A conventional rejecting unit 31 is provided for removing a defective armature from work plane 28.

Electrode 18 is disposed in electrode axis 30 and directly above hook 16. Electrode 18 is releasably fixed to a supporting block 32. Supporting block 32 includes internal passageways 34 for channeling water from a water supply. The water cools the electrode at predetermined rates and intervals. Supporting block 32 is rigidly flanged to a first hollow member 36 by screws 38.

A cylindrical member 40 is seated on the bottom of hollow member 36. A force transducer, such as a load cell 42, is seated in cylindrical member 40. One end of a pin 44 is fixed to hollow member 36, and the other end engages a recess 46 in cylindrical member 40. Pin 44 prevents cylindrical member 40 (and load cell 42) from rotating with respect to hollow member 36.

Hollow member 36 connects to a second hollow member 48 by a flange 50 and by screws 52. Hollow member 36 is centered and slides on the bottom extension of hollow member 48. A portion of the bottom of hollow member 48 is maintained in contact with a protruding member 54 of load cell 42.

The apparatus of this invention permits forces acting on hollow member 36 (caused by pressure against electrode 18) to compress load cell 42. Hollow member 36 can translate relative to hollow member 48. Spacing 56 between hollow members 36 and 48 permits vertical movement between the two members. A roller 57 is fixed to hollow member 36 and runs along supporting block 58. Roller 57 maintains the proper electrode alignment on the electrode axis 30.

Supporting block 58 surrounds hollow member 48, but is not in contact with it. Supporting block 58 is rigidly fixed to a slide 64, which slides on stationary frame guides 66.

To vary the electrode rest position, (with respect to the armature supporting plane), supporting block 58 includes a bar end 68 which is axially fixed, but which is free to rotate in appendix 70 of supporting block 58. A threaded portion of bar 68 engages a threaded block 72, which is fixed to a main frame 74 of the apparatus by a screw 76. Slide 64 may be actuated by any suitable actuating means to adjust the electrode rest position to accommodate different commutator sizes.

A threaded ball sleeve 78 is rigidly fixed to hollow member 48 by a lid 80 and screws 82. Ball screw 84 engages threaded sleeve 78 and can be rotated to translate hollow member 48 along electrode axis 30. Hollow member 48 includes a bottom cavity 86 that receives the protruding portion of ball screw 84. The sides of cavity 86 do not contact ball screw 84, thus allowing ball screw 84 to rotate relative to hollow member 48. Hollow member 48 will only translate. A stud member 88 projects from hollow member 48, and contacts supporting block 58 to prevent hollow member 48 (and hollow member 36) from rotating. A connection member 90 is flanged on its bottom end to supporting block 58, and is held in place by screws 92. The other end of member 90 supports and is joined to drive group 94. Drive group 94 includes a low inertia dc motor, reduction gear, a tachometer, and an encoder. Ball screw shoulder 96 rests against bearing 98, which seats in connection member 90. A threaded sleeve 100 connects ball screw 84 to the output drive shaft 102 of the dc motor, and ensures that ball screw 84 is axially positioned against bearing 98.

A mass electrode 106 is rigidly connected to arm 108, which is hinged to slide 64. The rest position of mass electrode 106 may be adjusted to accommodate different commutator sizes by adjusting the position of slide 64. An actuator and relative sensing devices move mass electrode 106, causing the electrode to contact the commutator bar to be fused.

Electric supply cables 110 are connected to block 32 and arm 108. Electrical energy may be applied to electrode 18 as a constant current, and may be integrated in time. Electrical energy may be applied at a predetermined electrode displacement or electrode force.

A rotation of motor output drive shaft 102 will cause ball screw 84 to rotate. Its engagement with sleeve 100 will cause hollow member 48, hollow member 36, and electrode 18 to translate along electrode axis 30. Ball screw 84 converts the rotational motion of the motor into a translational 5 motion of electrode 18 along axis 30. When electrode 18 encounters an opposing force exerted by hook 16, load cell 42 is compressed against hollow member 48. Space 56 allows hollow member 36 to translate along hollow member 48, and will allow load cell 42 to deform correspondingly. In a rest position, or when electrode 18 is moving but is not in contact with hook 16, hollow member 48 is supported by screw heads 112.

In an alternative embodiment, load cell 42 is disposed beneath the commutator support block, on work plane 28. Hollow members 36 and 48 are rigidly connected. Load cell 42 deforms in response to the amount of force exerted on hook 16 when electrode 18 descends upon the hook.

Figure 6:
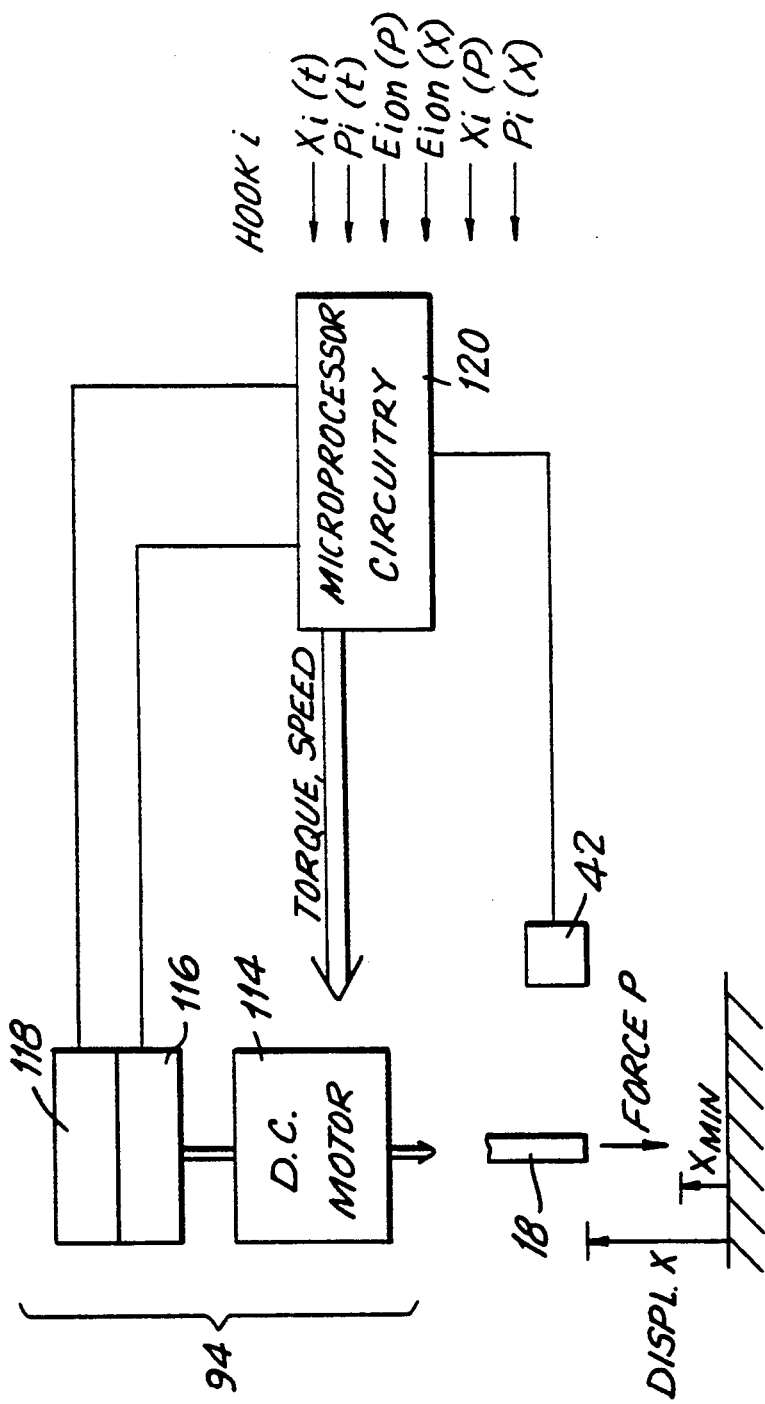
FIG. 6 is a schematic diagram of the feedback loop control system of this invention which can be used in the fusing machine of FIG. 5.

Referring to FIG. 6, several measurements may be obtained during the fusion process by connecting a motor 114, a tachometer 116, an encoder 118 (which collectively form drive group 94 of FIG. 5), and load cell 42 to a suitable microprocessor-based control circuit 120. The measurable quantities include electrode displacement (hook deformation) and electrode pressure. The displacement is derived, using encoder 118, from the number of turns of motor drive shaft 102. Load cell 42 measures the pressure or force resistance against the electrode.

The microprocessor and control circuitry of the present invention store distinct displacement functions $X(t)$ and $X(p)$ and force functions $P(x)$ and $P(t)$, predetermined for each type of hook to be fused. Microprocessor 120 changes the field conditions of motor 114 to control the motor's torque. Signals received from load cell 42 (indicating electrode pressure) enable the microprocessor to modify the motor torque to satisfy force functions $P(x)$ and $P(t)$. Encoder signals provide microprocessor 120 with displacement information, enabling the microprocessor to precisely lower (or raise) electrode 18 according to the displacement functions $X(t)$ and $X(p)$. The feedback loop control transmits the effects of changes made by microprocessor 120 on motor 114 back to the microprocessor, as feedback from load cell 42 and encoder 118. The feedback loop control constantly modifies the forces acting on electrode 18 to ensure strict adherence to the proper displacement or force function.

The apparatus of this invention makes many other measurements and functions possible. For example, the electric supply to electrode 18 is selectively variable for predetermined ranges and measured values of electrode displacement or electrode force.

Figure 7:
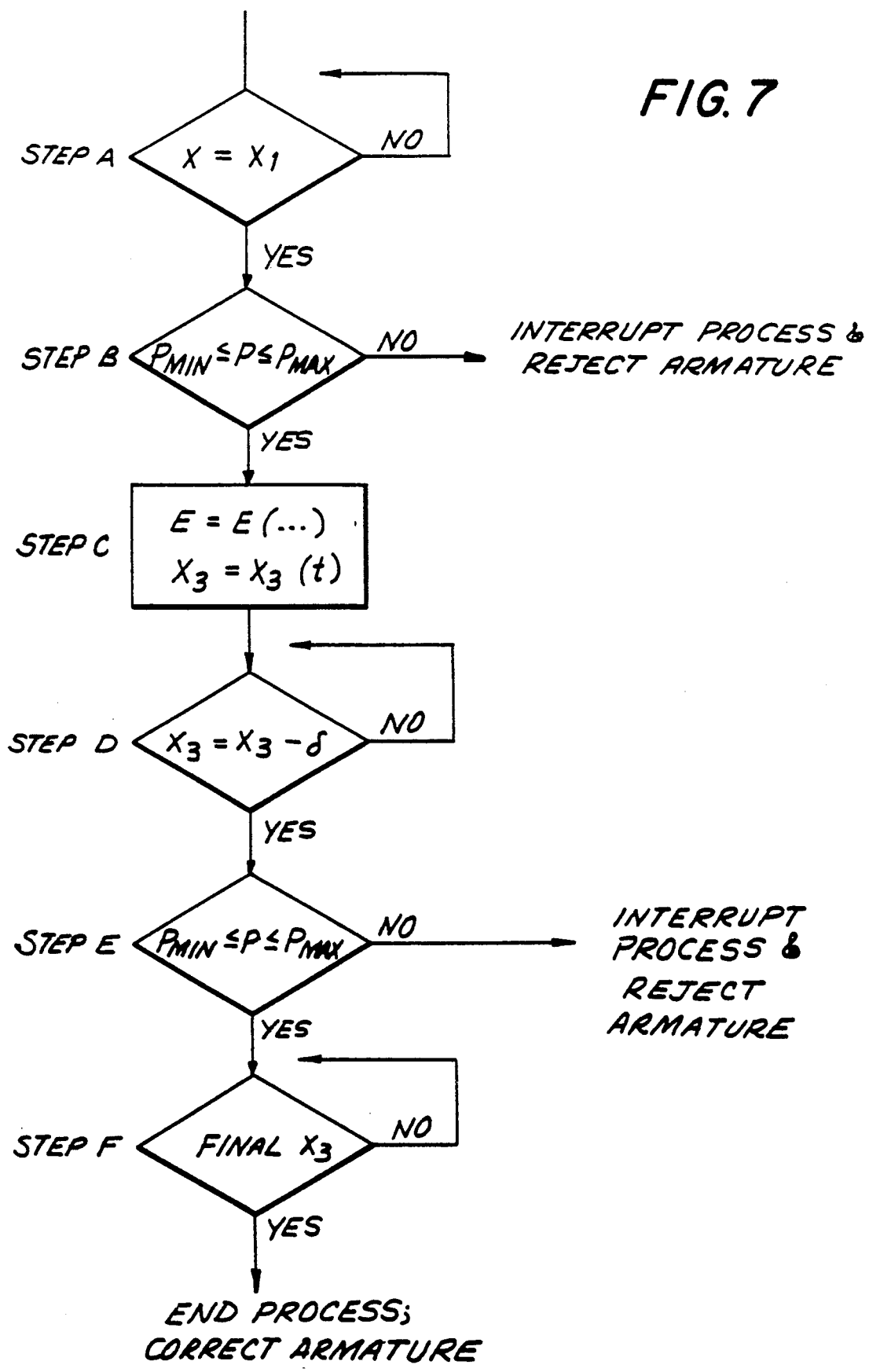
FIG. 7 is a flowchart of a measurement feedback loop for displacing a fusing electrode in a predetermined manner as a function of time.
Figure 8:
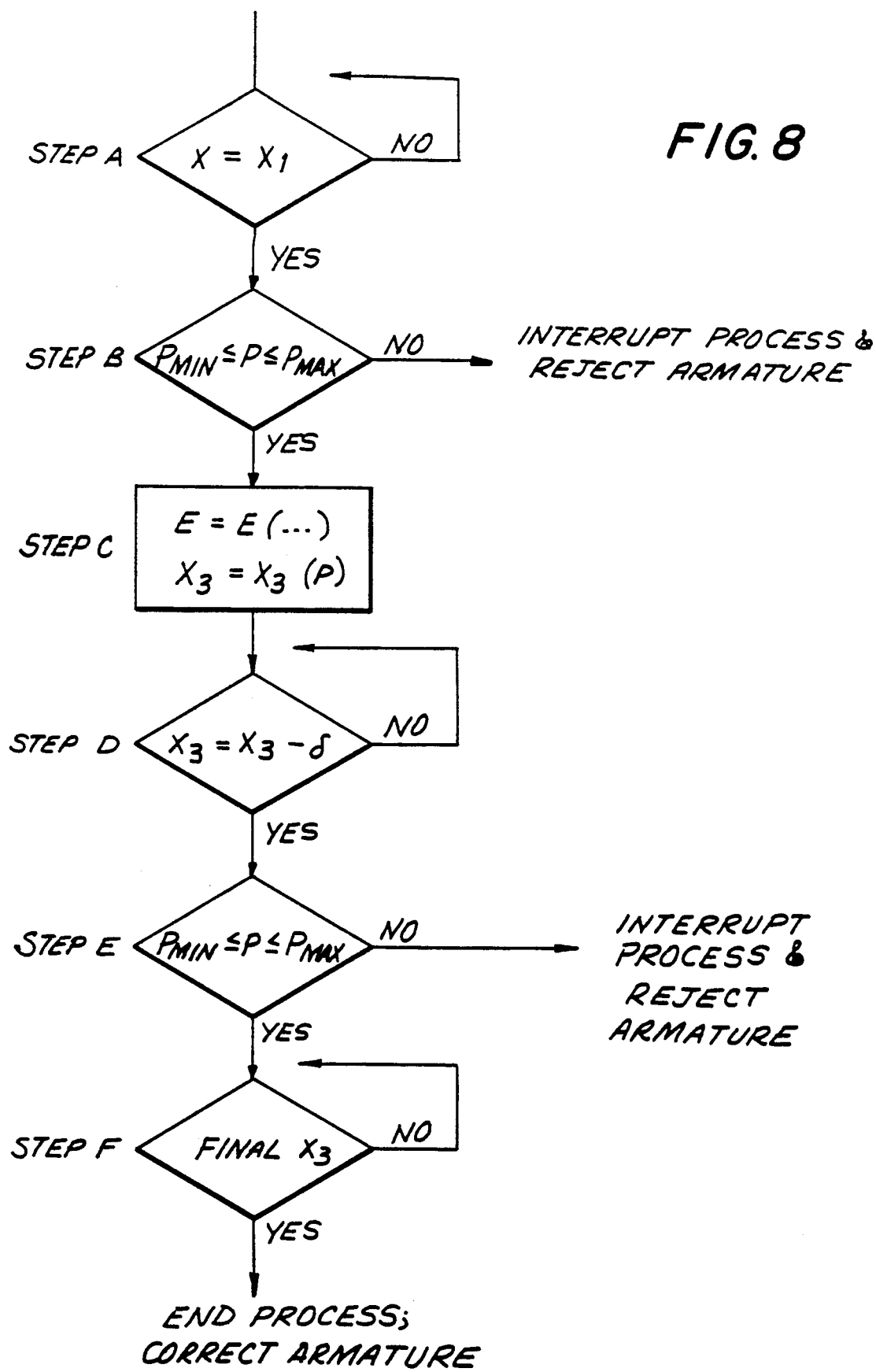
FIG. 8 is a flowchart of a measurement feedback loop for displacing a fusing electrode in a predetermined manner as a function of electrode force.

Referring now to FIGS. 7 and 8, the measurement feedback loop provides a means for precisely controlling the displacement of electrode 18 throughout the entire fusing cycle. The measured feedback loop may have two variations: electrode 18 may be displaced as a function of time (FIG. 7), or as a function of electrode force (FIG. 8).

The process described in the flowchart of FIG. 7 is used for fusing operations involving small wires or for operations where the final wire deformation must be within very narrow tolerances. The measurement feedback control loop monitors the electrode displacement to prevent excessive deformation of wire 10 by excessive electrode displacement. Excessive wire deformation increases the likelihood of wire breakage. The control loop also prevents too little displacement, which would result in a poorly fused wire and a bad electrical connection.

Motor output drive shaft 102 rotates ball screw 84, causing hollow member 36 and electrode 18 to translate along electrode axis 30 and to approach hook 16 at a predetermined speed. The displacement distance X is continuously monitored (step A) by encoder 118 and microprocessor 120. When electrode 18 is displaced a predetermined distance XI—corresponding to the point at which there is maximum surface contact between electrode 18 and hook 16—the electrode force measurement is verified (step B). If the force P acting upon the hook is not within a predetermined range, the process is interrupted and armature 26 is rejected. Step B is a quality control step designed to reject an armature with a hook which does not support the desired pressure. For example, an armature with a hook formed of poor quality materials, or with a hook that is missing a wire, would not support the pressure and would be rejected.

If the force on hook 16 is within the predetermined range, electrical current E is applied to the hook via electrode 18. Electrode 18 is displaced according to a displacement function $X(t)$ for the type of hook being fused (step C). The displacement of electrode 18 is continually monitored (step D) until the electrode reaches a predetermined displacement value which is slightly less than the final displacement. When electrode 18 reaches the proper displacement, load cell 42 again measures the electrode pressure (step E) to determine whether the hook will support a predetermined pressure. If the electrode pressure is not within the predetermined range, microprocessor 120 interrupts the cycle and rejects armature 26. If the electrode pressure is correct, encoder 118 and microprocessor 120 determine whether the displacement of electrode 18 has reached a final predetermined value (step F). The final displacement of electrode 18 corresponds to the point at which the electrode is sufficiently displaced to satisfactorily deform wire 10 under hook 16. If electrode 18 has not been sufficiently displaced, the feedback loop waits until the electrode is sufficiently displaced. Excessive electrode displacement will cause armature 26 to be rejected. When electrode 18 has been properly displaced according to step F, the cycle is interrupted, the armature is indexed for operation on the next hook, and the cycle begins again (step A).

FIG. 8 illustrates the second variation of the measurement feedback loop. Electrode 18 is displaced as a function of the force applied to the electrode. Steps A, B, and D-F of the process typically are the same as the corresponding steps shown in FIG. 7 (i.e., where electrode 18 is displaced as a function of time). However, during step C, electrode 18 is displaced as a function of electrode force. Microprocessor 120 receives force data from load cell 42, and acts on motor 114 to adjust electrode displacement according to the predetermined function X(p) for the hook being fused. Electrode displacement is continually monitored (step D) until electrode 18 reaches a predetermined displacement value which is slightly less than the final displacement, after which the process continues as previously described with respect to FIG. 7.

Figure 9:
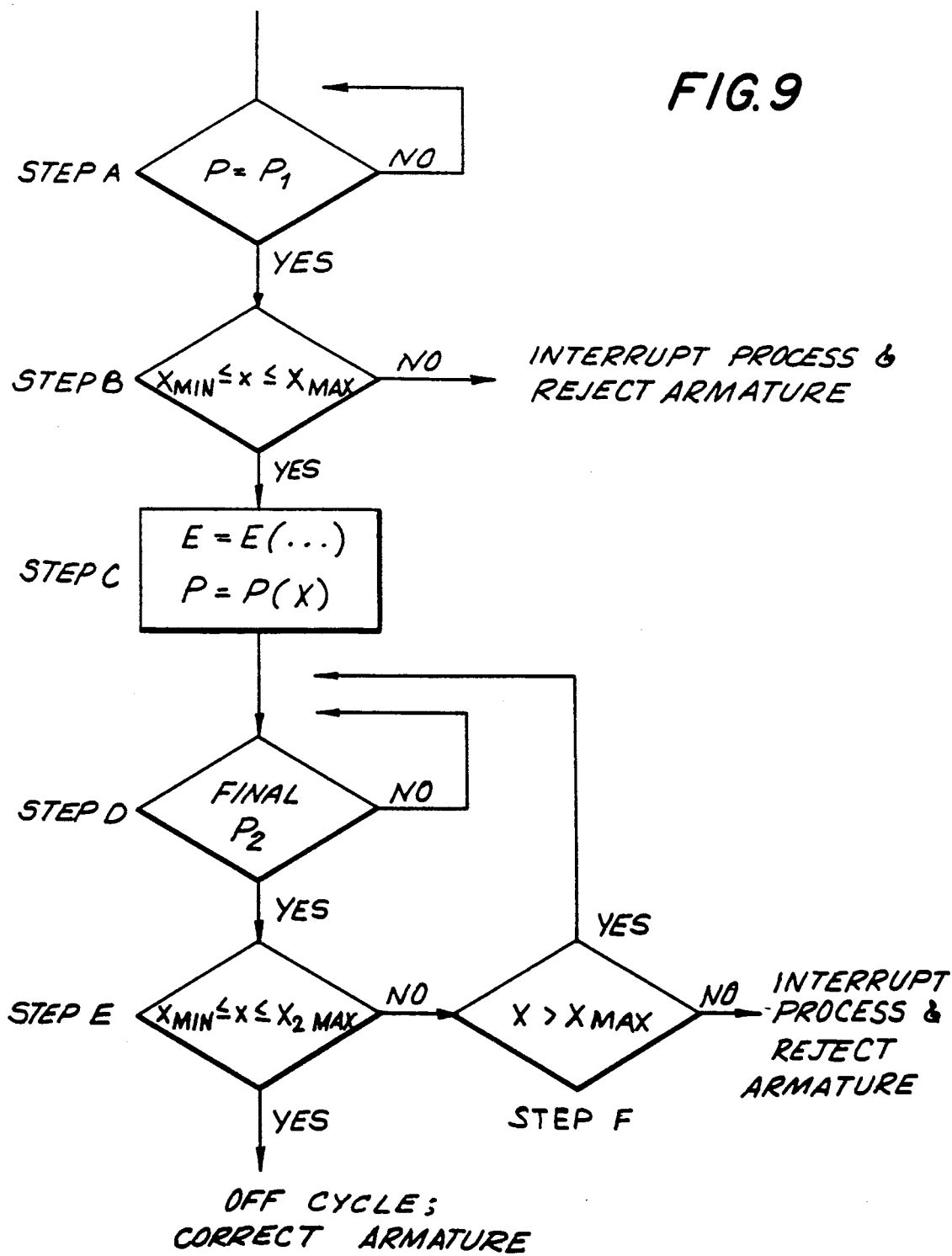
FIG. 9 is a flowchart of a force feedback loop for fusing armature wires with a predetermined force as a function of displacement.
Figure 10:
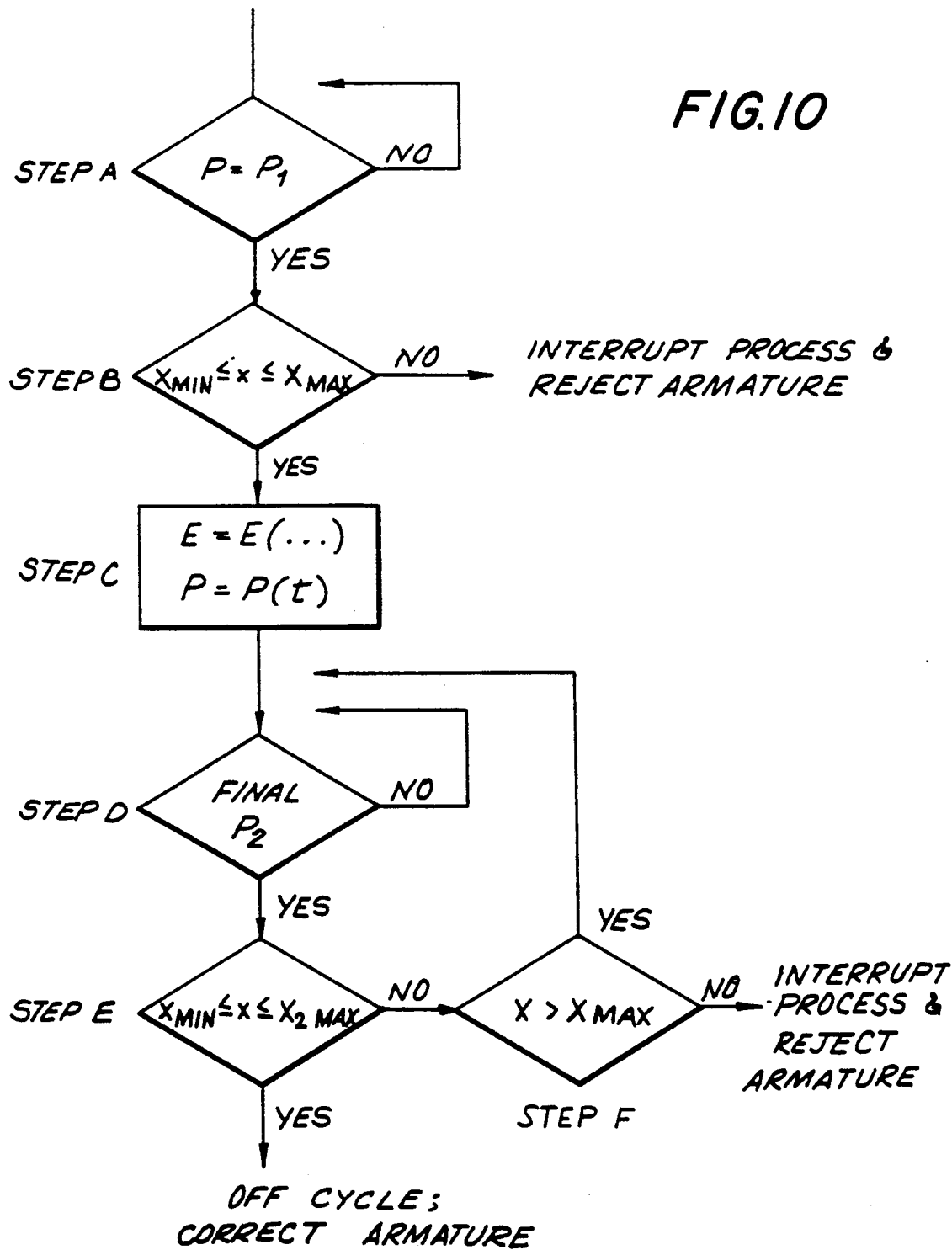
FIG. 10 is a flowchart of a force feedback loop for fusing armature wires with a predetermined force as a function of time.

Referring now to FIGS. 9 and 10, the force feedback loop provides a means for controlling the electrode pressure throughout the entire work cycle. The force feedback loop may have two variations: force may be applied to electrode 18 as a function of electrode displacement (FIG. 9), or as a function of time (FIG 10).

The process described in the flowchart of FIG. 9 controls the fusion process for wires with larger diameters. Greater tolerances are permitted for the final wire deformation under the hook when fusing large diameter wires than are permitted for thin wires. However, the final pressure values must be within a predetermined range to ensure a satisfactory cohesion joint. This is accomplished with an electrode force feedback control loop and load cell 42.

Motor output drive shaft 102 rotates ball screw 84, causing hollow member 36 and electrode 18 to translate along electrode axis 30 and to approach hook 16 at a predetermined speed. The electrode force P is continuously monitored (step A) by load cell 42 and microprocessor 120. When electrode 18 applies a predetermined force P1, the electrode displacement X is determined by encoder 118 and microprocessor 120 (step B). If displacement X is not within a predetermined range, the process is interrupted and armature 26 is rejected. Step B is a quality control step designed to ensure that electrode 18 is sufficiently displaced to properly contact hook 16 for applying electricity (i.e., there is maximum surface contact between electrode 18 and hook 16). Maximum surface contact between the electrode and the hook results in low current densities through electrode 18, preventing excessive electrode wear.

If the electrode displacement is within the predetermined range, electrical current E is applied to hook 16 via electrode 18. Pressure is applied to electrode 18 as a function of displacement according to a force function P(x) for the hook being fused (step C). A different force function typically is stored in microprocessor circuitry 120 for each type of hook that electrode 18 will deform. The force applied to electrode 18 is continually monitored by load cell 42 and adjusted by the action of microprocessor 120 to maintain the desired pressure as a function of displacement. The force is monitored (step D) until it reaches a final predetermined value P2. When the proper force has been applied, encoder 118 and microprocessor 120 again determine the electrode displacement (step E) to determine whether the force function applied to the hook produced the correct electrode displacement (and hook deformation). If the electrode displacement is correct, the fusing cycle is interrupted, the armature is indexed for operation on the next hook, and the cycle begins again (step A). If the electrode displacement is not within the predetermined range, the process continues to an additional step (step F). If the electrode displacement exceeds the maximum displacement, the cycle begins again at step C. If the electrode displacement is less than the maximum allowable displacement, microprocessor 120 interrupts the cycle and rejects armature 26.

FIG. 10 illustrates the second variation of the force feedback loop. Force is applied to electrode as a function of time. Steps A, B, and D-F of the process typically are the same as the corresponding steps shown in FIG. 9 (i.e., where force is applied to electrode 18 as a function of displacement). However, during step C, force is applied to electrode 18 as a function of time. Microprocessor 120 receives force data from load cell 42, and acts on motor 114 to adjust the electrode force according to the predetermined function P(t) for the hook being fused. Electrode force is continually monitored (step D) until the force reaches a predetermined force value P2, after which the process continues as previously described with respect to FIG. 9.

Although the invention has been described with respect to fusing hook members 16 and armature wires 10 to commutator bars 12, the invention is equally applicable to fusing armature wires into commutator slots. The same feedback loop displacement control or feedback loop force control governs the fusing operation.

Figure 11:
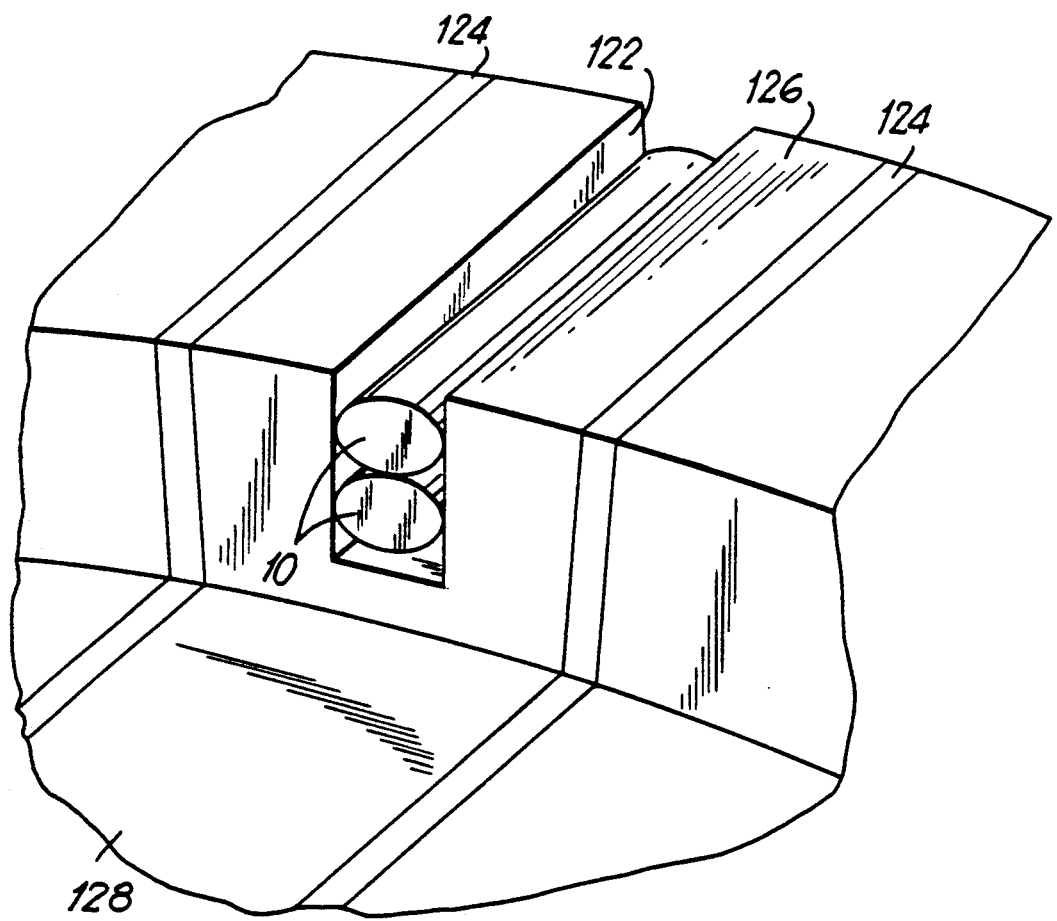
FIG. 11 is a partial perspective view of a commutator slot and armature wires.
Figure 12:
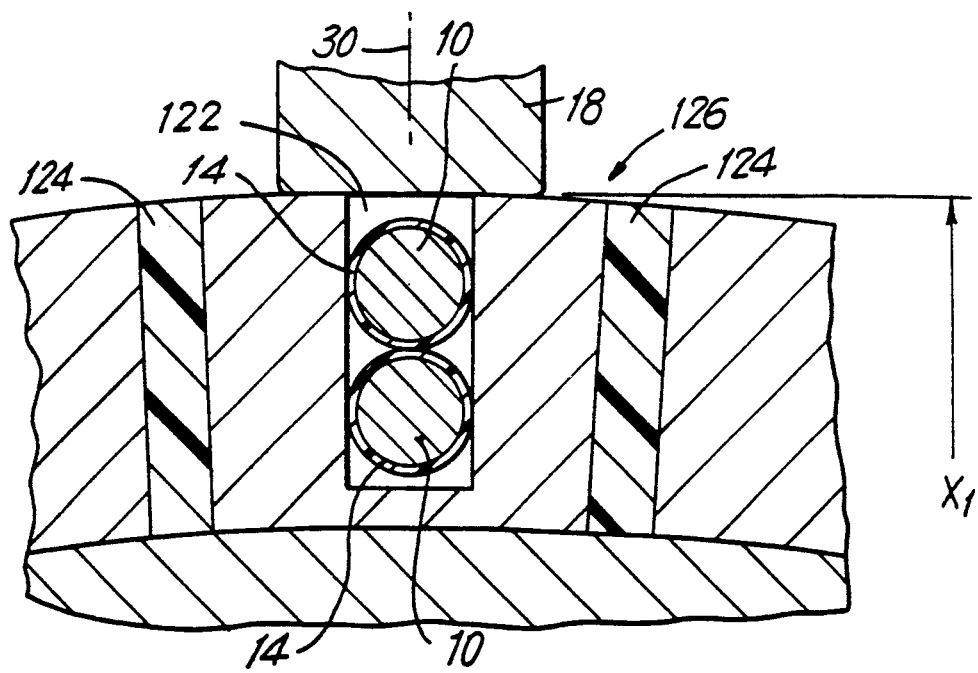
FIG. 12 is a cross-sectional view of a commutator slot and armature wires prior to fusing.
Figure 13:
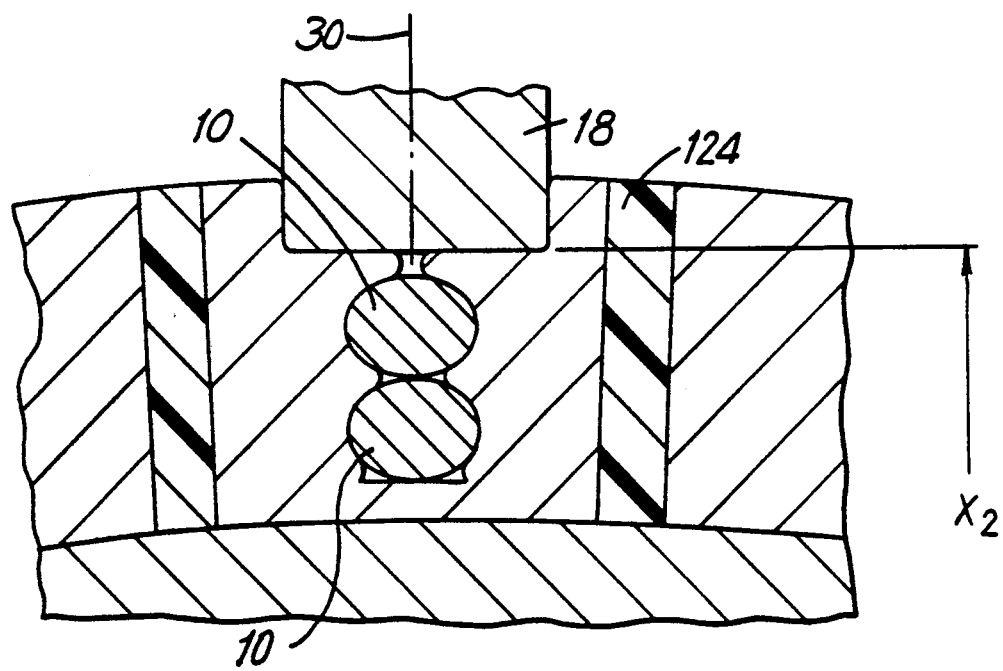
FIG. 13 is a cross-sectional view of a commutator slot and armature wires during the fusing operation.

Referring to FIGS. 11-13, wires 10 are inserted, generally one on top of the other, in slot 122 with appropriate lead terminating equipment. Insulators 124 separate one commutator segment from another. The slots are cut in a commutator "ridge" 126. The commutator running surface is designated by reference numeral 128.

Electrode 18 contacts commutator ridge 126, applying pressure to deform the commutator slot around wires 10. It is most important to have a precise electrode displacement when current is applied. The optimal displacement X1 (FIG. 12) coincides with maximum surface contact between electrode 18 and commutator ridge 126. Current flowing through electrode 18 generates heat, which initially heats the surrounding slot 122, and causes the wire insulation 14 contacting the sides of slot 122 (the slot is usually designed to tightly hold the wires) to vaporize. Electrode 18 exerts force towards the slot bottom, causing plastic deformation of wires 10 and slot 122.

The plastic deformation increases the amount of heated metal contacting wires 10. This further vaporizes insulation 14. FIG. 13 shows a final condition of the slot-fusing process, with the metal of slot 122 tightly surrounding the deformed wires 10. The final slot deformation X2 (FIG. 13) must be within predetermined tolerances to ensure a proper connection and to ensure that all wires are properly positioned.

As described for deforming a hook, electrode 18 applies force to commutator ridge 126 as a function of displacement, according to a predetermined force function. Load cell 42 and microprocessor 120 form a closed loop system to continually monitor and adjust the force applied, according to the force function. Applying force according to the predetermined function ensures that large wires will be tightly surrounded by metal from the walls of slot 122 and ensures that the connection will have the correct mechanical and electrical properties. Microprocessor circuitry 120 stores a distinct force function for each slot connection variation (i.e., geometry of the slot, wire size, wire and commutator material, and type of wire insulation).

Referring now to FIGS. 14–17, the methods and apparatus of the present invention may be used to fuse a stator lead wire 130 to a hook member of an electric motor's stator 132. Stator hooks are fused in substantially the same manner as commutator hooks. Stator hooks may be fused using the same force and displacement feedback loops that are used to fuse commutator hooks 16.

Figure 14:
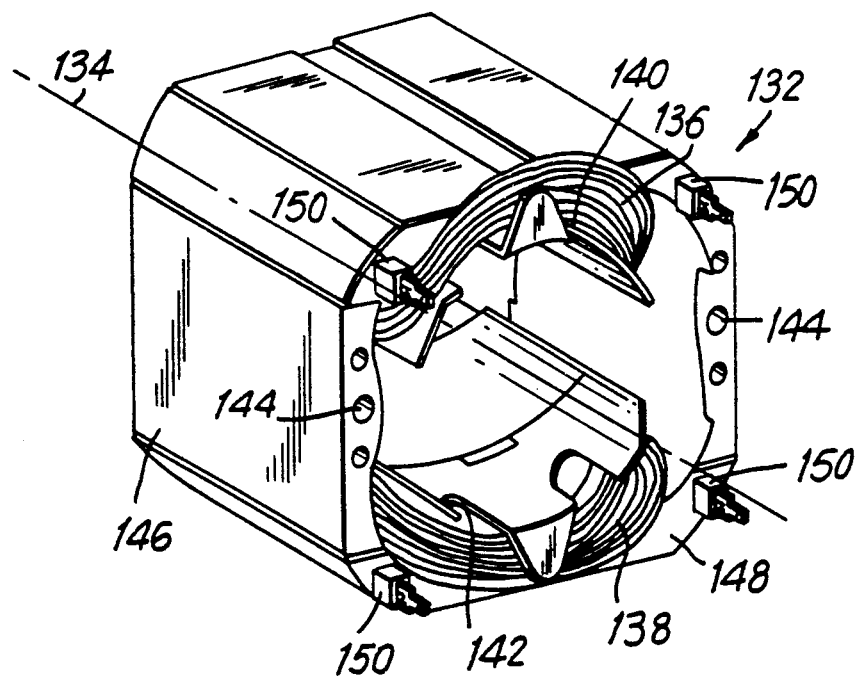
FIG. 14 is a perspective view of a stator of an electric motor.
Figure 15:
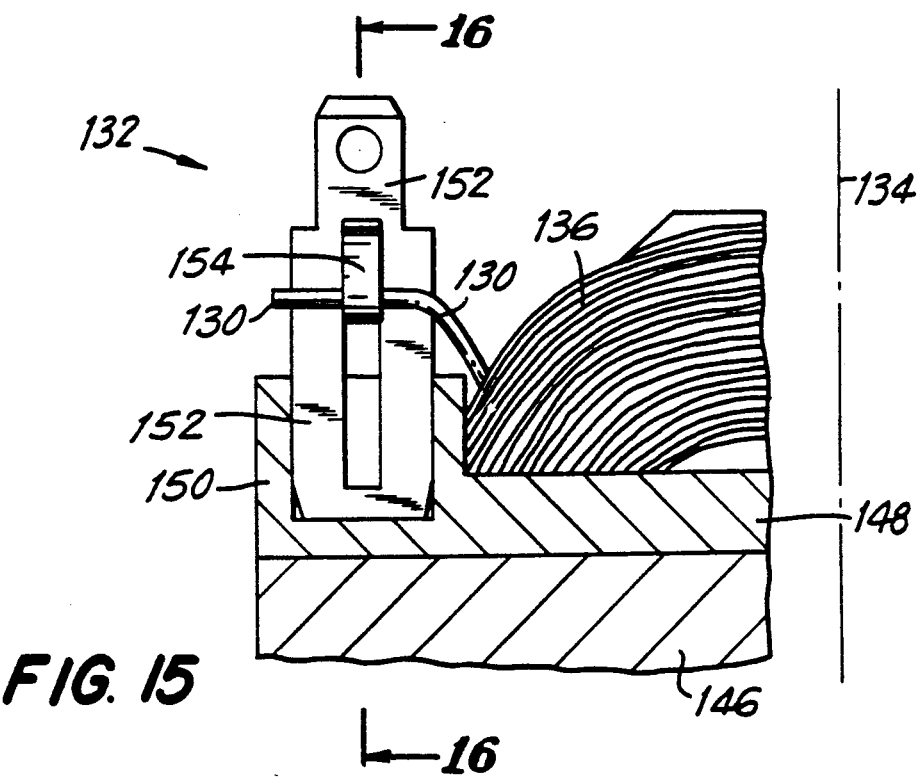
FIG. 15 is a top view, partly in section, of the stator of FIG. 14, equipped with a terminal board and terminal.

FIG. 14 shows stator 132, with longitudinal axis 134, wrapped with coils 136 and 138 around poles 140 and 142, respectively. Openings 144 are provided adjacent the lamination stack 146 for receiving and mounting a terminal board 148 against an end face of stack 146. Each of projecting members 150 frictionally engages a terminal 152 for receiving stator lead wire 130 and for providing external lead connections to the stator.

During winding, lead wire 130 typically is anchored to auxillary grippers (not shown). During a termination operation, shown in FIG. 15, lead wire 130 is placed between a hook 154 and the main body of terminal 152. Hook 154 typically is then deformed slightly to hold lead wire 130 in the proper position while stator 132 is transferred to the fusing machine. Hook 154 is formed by cutting a central portion of the body of terminal 152 and bending the central portion upwards.

Figure 16:
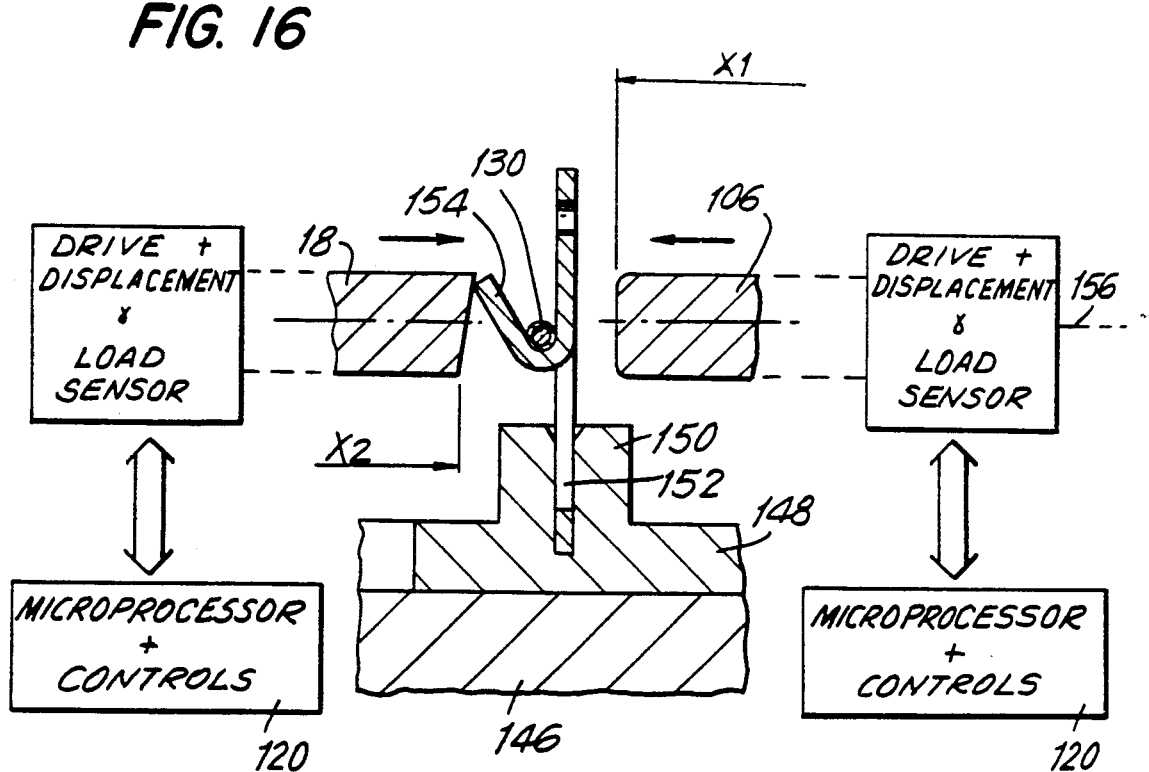
FIG. 16 is a partial, cross-sectional view taken along line 16—16 of the stator of FIG. 15, with the stator positioned in the fusing machine prior to fusing.

FIG. 16 shows stator 132 positioned in a fusing machine between fusing electrode 18 and mass electrode 106. Electrodes 18 and 106 are aligned on a horizontal axis 156. The stator is positioned to align hook 154 in axis 156, between electrodes 18 and 106. The electrodes move along axis 156 to contact hook 154 and to fuse the hook and lead wire 130.

Figure 17:
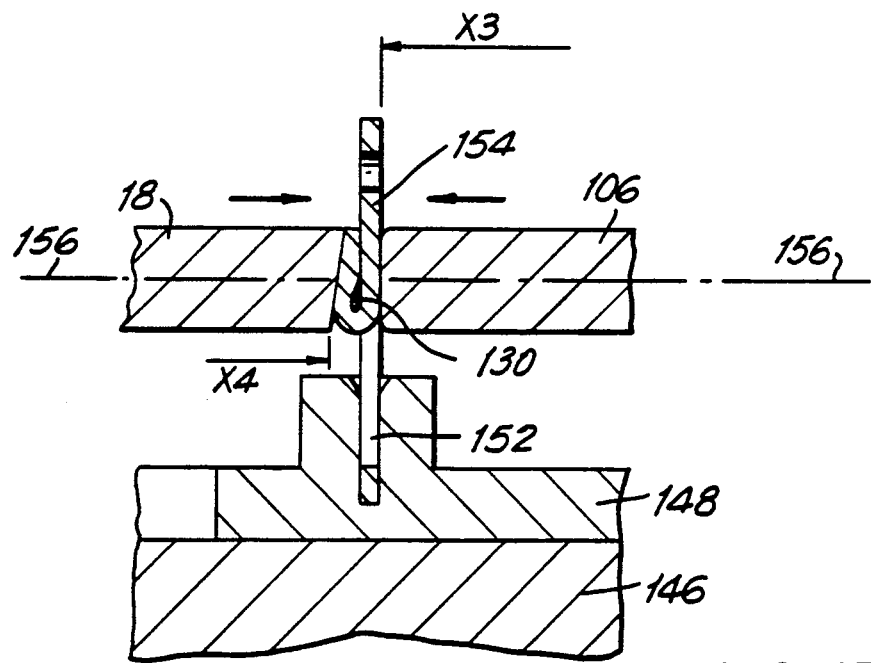
FIG. 17 is the stator of FIG. 16 after fusing is completed.

Each of electrodes 18 and 106 may be moved along axis 156 by independently-controlled drive mechanisms, which typically are equipped with a force transducer and a displacement sensor. One skilled in the art will realize that the apparatus and methods described herein for fusing armature hooks are equally applicable to fusing stator hooks. For example, stator hook 154 can be fused according to a predetermined force or displacement function, using a feedback force or displacement control loop (e.g., as shown in FIGS. 7–10). Also, electric current may be selectively applied to electrode 18 for predetermined values of electrode displacement or force. FIG. 17 shows the final, fused connection of hook 154 and lead wire 130.

If there are a large number of terminals and lead wires on the stator, it may be necessary to simultaneously fuse more than one hook at a time. This simultaneous fusing operation can be performed with a plurality of individual fusing electrodes that are connected to a common drive mechanism, with common displacement and force sensors. The individual electrodes fuse several hooks at the same time.

It will be understood that the foregoing is merely illustrative of the principles of the invention, and that various modifications can be made by those skilled in the art without departing from the scope and spirit of the invention.

The invention claimed is:

1. Apparatus for fusing together two electrical conductors which collectively comprise a workpiece, said apparatus comprising:
   a fusing member;
   means for moving the fusing member relative to said workpiece in order to cause said fusing member to contact and apply force to said workpiece to deform said workpiece;
   means for monitoring said force; and
   means responsive to said means for monitoring for controlling said means for moving to deform said workpiece by causing said force to substantially conform to a predetermined force function.

2. The apparatus defined in claim 1 wherein said predetermined force function is a function which relates force to elapsed time.

3. The apparatus defined in claim 1 wherein said predetermined force function is a function which relates to force to relative motion between said fusing member and said workpiece.

4. The apparatus defined in claim 1 further comprising:
   further means responsive to said means for monitoring for causing an electrical current to flow through said fusing member and said workpiece when said fusing member applies a predetermined force to said workpiece.

5. The apparatus defined in claim 4 wherein the electrical resistance of said fusing member is greater than the electrical resistance of said workpiece so that said electrical current heats said fusing member and heat flows from said fusing member to said workpiece.

6. The apparatus defined in claim 1 further comprising:
   means responsive to said means for controlling for rejecting said workpiece if said force cannot be made to substantially conform to said predetermined force function.

7. The apparatus of claim 1, wherein said predetermined force function comprises a constant force applied for a predetermined interval of time.

8. The apparatus of claim 1, wherein said predetermined force function comprises a constant force applied for a predetermined range of displacement of said fusing member.

9. Apparatus for fusing together two electrical conductors which collectively comprise a workpiece, said apparatus comprising:
   a fusing member;
   means for moving the fusing member relative to said workpiece in order to cause said fusing member to contact and deform said workpiece;
   means for monitoring the relative motion of said fusing member and said workpiece; and
   means responsive to said means for monitoring form controlling said means for moving to deform said workpiece by causing the relative motion of said fusing member and said workpiece to substantially conform to a predetermined displacement function.

10. The apparatus defined in claim 9 wherein said predetermined displacement function is a function which relates displacement to elapsed time.

11. The apparatus defined in claim 9 wherein said predetermined displacement function is a function which relates displacement to force, and wherein said apparatus further comprises:

further means for monitoring the force with which said fusing member contacts said workpiece, said means for controlling being additionally responsive to said further means for monitoring.

12. The apparatus defined in claim 9 further comprising:

additional means responsive to said means for monitoring for causing an electrical current to flow through said fusing member and said workpiece when a predetermined amount of relative motion of said fusing member and said workpiece has occurred.

13. The apparatus defined in claim 12 wherein the electrical resistance of said fusing member is greater than the electrical resistance of said workpiece so that said electrical current heats said fusing member and heat flows from said fusing member to said workpiece.

14. The apparatus defined in claim 9 further comprising:

means responsive to said means for controlling for rejecting said workpiece if said relative motion of said fusing member and said workpiece cannot be made to substantially conform to said predetermined displacement function.

15. The apparatus of claim 9, wherein said predetermined displacement function comprises displacing said fusing member at a constant speed.

16. The apparatus of claim 9, wherein said predetermined displacement function comprises displacing said fusing member at a constant speed when a predetermined force is applied to said workpiece by said fusing member.

17. Apparatus for fusing together two electrical conductors which collectively comprise a workpiece, said apparatus comprising:

a fusing member;
means for moving the fusing member relative to said workpiece in order to cause said fusing member to contact and apply force to said workpiece to deform said workpiece;
first means for monitoring the displacement of said fusing member relative to said workpiece;
second means for monitoring the force applied to said workpiece by said fusing member; and
means responsive to said first and second means for controlling said means for moving to cause said fusing member to deform said workpiece by applying a predetermined force to said workpiece as a function of said displacement.

18. The apparatus defined in claim 17 further comprising:

further means responsive to said first means for causing an electrical current to flow through said fusing member and said workpiece when said fusing member has reached a predetermined displacement relative to said workpiece.

19. The apparatus defined in claim 18 wherein the electrical resistance of said fusing member is greater than the electrical resistance of said workpiece so that said electrical current heats said fusing member and heat flows from said fusing member to said workpiece.

20. The apparatus defined in claim 17 further comprising:

further means responsive to said second means for causing an electrical current to flow through said fusing member and said workpiece when said fusing member applies a predetermined force to said workpiece.

21. The apparatus defined in claim 20 wherein the electrical resistance of said fusing member is greater than the electrical resistance of said workpiece so that said electrical current heats said fusing member and heat flows from said fusing member to said workpiece.

22. The apparatus defined in claim 17 further comprising:

additional means responsive to said first and second means for rejecting said workpiece if the relationship between the force applied to said workpiece by said fusing member and the resulting displacement of said fusing member relative to said workpiece deviates from a predetermined relationship by more than a predetermined amount.

23. The method of using a fusing member to fuse together two electrical conductors which collectively comprise a workpiece, said method comprising the steps of:

moving said fusing member relative to said workpiece in order to cause said fusing member to contact and apply force to said workpiece to deform said workpiece;
monitoring the force thus applied to said workpiece; and
controlling the motion of said fusing member relative to said workpiece in accordance with the monitored force to deform the workpiece by causing the force applied to said workpiece to substantially conform to a predetermined force function.

24. The method defined in claim 23 wherein said predetermined force function is a function which relates force to elapsed time.

25. The method defined in claim 23 wherein said predetermined force function is a function which relates force to relative motion between said fusing member and said workpiece.

26. The method defined in claim 23 further comprising the step of:

causing an electrical current to flow through said fusing member and said workpiece when said fusing member applies a predetermined force to said workpiece.

27. The method defined in claim 26 wherein the electrical resistance of said fusing member is greater than the electrical resistance of said workpiece so that said electrical current heats said fusing member and heat flows from said fusing member to said workpiece.

28. The method defined in claim 23 further comprising the step of:

rejecting said workpiece if said force cannot be made to substantially conform to said predetermined force function.

29. The apparatus of claim 23, wherein said predetermined force function comprises a constant force applied for a predetermined interval of time.

30. The apparatus of claim 23, wherein said predetermined force function comprises a constant force applied for a predetermined range of displacement of said fusing member.

31. The method of using a fusing member to fuse together two electrical conductors which collectively comprise a workpiece, said method comprising the steps of:

moving said fusing member relative to said workpiece in order to cause said fusing member to contact and deform said workpiece;

monitoring the relative motion of said fusing member and said workpiece; and controlling the motion of said fusing member relative to said workpiece in accordance with the monitored relative motion in order to deform said workpiece by causing the relative motion of said fusing member and said workpiece to substantially conform to a predetermined displacement function.

32. The method defined in claim 31 wherein said predetermined displacement function is a function which relates displacement to elapsed time.

33. The method defined in claim 31 wherein said predetermined displacement function is a function which relates displacement to the force applied to said workpiece by said fusing member.

34. The method defined in claim 31 further comprising the step of:

causing an electrical current to flow through said fusing member and said workpiece when a predetermined amount of relative motion of said fusing member and said workpiece has occurred.

35. The method defined in claim 34 wherein the electrical resistance of said fusing member is greater than the electrical resistance of said workpiece so that said electrical current heats said fusing member and heat flows from said fusing member to said workpiece.

36. The method defined in claim 31 further comprising the step of:

rejecting said workpiece if said relative motion of said fusing member and said workpiece cannot be made to substantially conform to said predetermined displacement function.

37. The apparatus of claim 31, wherein said predetermined displacement function comprises displacing said fusing member at a constant speed.

38. The apparatus of claim 31, wherein said predetermined displacement function comprises displacing said fusing member at a constant speed when a predetermined force is applied to said workpiece by said fusing member.

39. The method of using a fusing member to fuse together two electrical conductors which collectively comprise a workpiece, said method comprising the steps of:

moving said fusing member relative to said workpiece in order to cause said fusing member to contact and apply force to said workpiece to deform said workpiece;

monitoring the displacement of said fusing member relative to said workpiece;

monitoring the force applied to said workpiece by said fusing member; and controlling the motion of said fusing member relative to said workpiece in accordance with the monitored displacement and force in order to deform said workpiece by causing said fusing member to apply a predetermined force to said workpiece as a function of displacement.

40. The method defined in claim 39 further comprising the step of:

causing an electrical current to flow through said fusing member and said workpiece when said fusing member has reached a predetermined displacement relative to said workpiece.

41. The method defined in claim 40 wherein the electrical resistance of said fusing member is greater than the electrical resistance of said workpiece so that said electrical current heats said fusing member and heat flows from said fusing member to said workpiece.

42. The method defined in claim 39 further comprising the step of:

causing an electrical current to flow through said fusing member and said workpiece when said fusing member applies a predetermined force to said workpiece.

43. The method defined in claim 42 wherein the electrical resistance of said fusing member is greater than the electrical resistance of said workpiece so that said electrical current heats said fusing member and heat flows from said fusing member to said workpiece.

44. The method defined in claim 39 further comprising the step of:

rejecting said workpiece if the relationship between the force applied to said workpiece by said fusing member and the resulting displacement of said fusing member relative to said workpiece deviates from a predetermined relationship by more than a predetermined amount.

45. A method for fusing armature wires to the commutator of an electric motor, comprising the steps of:

causing a fusing member to contact a predetermined section of the commutator to deform the section to a first distance from a reference point, said first distance corresponding to the point at which maximum surface contact between said fusing member and the commutator occurs;

determining whether the force on said fusing member is within a predetermined range of force that corresponds to an acceptable commutator condition;

applying electrical current to said fusing member to heat said member and any portions of said commutator and armature wire in thermal contact with said member;

applying force to said fusing member to displace said member as a function of time, according to a predetermined displacement function, to deform said section of said commutator;

continuously monitoring the displacement of said fusing member during said step of applying force to said member;

adjusting the displacement of said fusing member in response to data obtained while monitoring the displacement of said fusing member to maintain said predetermined displacement function, until said member is displaced a predetermined distance from said reference point;

determining whether the force on said fusing member is within a predetermined range of force, corresponding to an acceptable fusion condition; and determining whether said fusing member is displaced a predetermined distance from said reference point corresponding to an acceptable fusion condition.

46. A method for fusing armature wires to the commutator of an electric motor, comprising the steps of:

causing a fusing member to exert a predetermined force on a predetermined section of the commutator, said force corresponding to the force at which maximum surface contact between the fusing member and the commutator occurs;

determining whether the displacement of the fusing member from a reference point is within a predetermined range corresponding to an acceptable commutator condition;

applying electrical current to the fusing member to heat said fusing member and any portions of said commutator and armature wire in thermal contact with said fusing member;

applying force to the fusing member as a function of displacement according to a predetermined force function to deform said section of said commutator;

continuously monitoring the force applied to said fusing member during said step of applying force to said fusing member;

adjusting the force applied to said electrode in response to data obtained while monitoring the force applied to the electrode to maintain said predetermined force function, until said force equals a predetermined force which corresponds to an acceptable fusion condition; and determining whether the displacement of the electrode from said reference point is within a predetermined range corresponding to an acceptable fusion condition.

47. The method of using a fusing member to fuse together two electrical conductors which collectively comprise a workpiece, said method comprising the steps of:

moving said fusing member a first predetermined distance relative to said workpiece to cause said fusing member to contact and deform said workpiece; and applying a first predetermined force to said workpiece with said fusing member for a predetermined time period; and moving said fusing member a second distance relative to said workpiece to cause a predetermined deformation of said workpiece.

48. The method of claim 47, further comprising the step of:

applying a second predetermined force to said workpiece with said fusing member for a second predetermined time period, prior to moving said fusing member said second distance.

49. The method of claim 47, further comprising the steps of:

causing an electrical current to flow through said fusing member and said workpiece, for at least a portion of said first predetermined time period, while applying said first predetermined force.

50. The method of claim 47, further comprising the steps of:

after said fusing member has been moved said second distance, determining whether the force on said fusing member is within a predetermined range of force corresponding to an acceptable fusion condition; and rejecting said workpiece if the force on said fusing member is not within said predetermined range of force.

* * * * *